though somewhat more durable, are very costly, and require both skill and time in their application. Such coatings inevitably form, not a rigid film for surface-hardening, but rather a low-density, soft, porous, non-waterproof unit which requires additional finishing to produce satisfactory results.

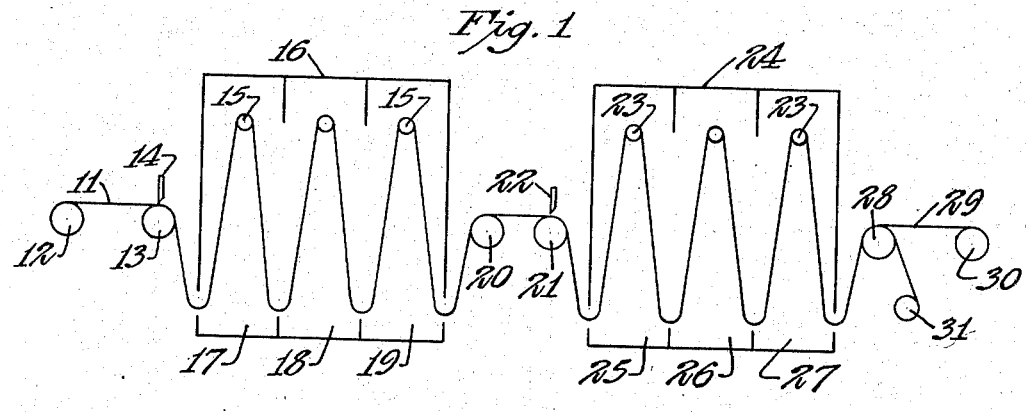
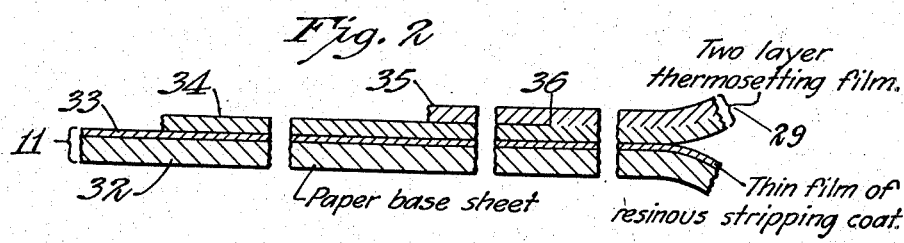
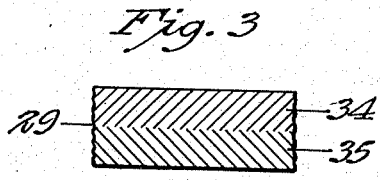
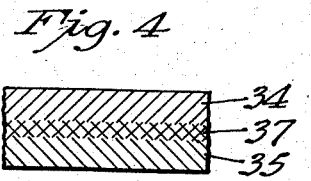
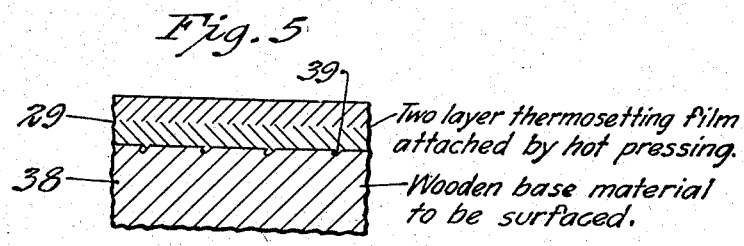

United States Patent Office 2,883,315
Patented Apr. 21, 1959

2,883,315

COMPOSITE RESIN FILM SHEET ASSEMBLIES AND METHOD OF PREPARING AND DECORATING SAME

Philip V. Palmquist, New Canada Township, Ramsey County, Minn., assignor to Minnesota Mining & Manufacturing Company, St. Paul, Minn., a corporation of Delaware Application July 18, 1944, Serial No. 545,520

11 Claims. (Cl. 154—46)

This invention relates to protective and decorative surface finishes and to methods for their production and application.

Resinous protective coatings have generally been applied to the unfinished surfaces of wooden or metal furniture, structural units, and the like, from solution in a volatile vehicle. Application, as by brush or spray, is necessarily in several coats, with intermediate evaporation of volatile vehicle. For the most permanent type of finishes, the article thus coated must then be subjected to a high temperature baking or surface heating.

For certain uses, as for table tops, wall tile and like surfaces requiring high resistance to solvents, water, heat and abrasion, pre-formed sheets which include resinous materials have been used. These sheets are made on a fibrous base such as paper or cloth, impregnated and coated with thermosetting resinous materials, and heated between polished metal platens until completely reacted to a permanently insoluble, heat-resistant stage. The sheets are then cemented in place on flat surfaces, for example restaurant table tops, as by means of suitable solvent type or heat-activated cements. But these sheets are available only in sizes limited by the size of the press platens used in their manufacture, and are so resilient and springy, and at the same time so brittle, that they cannot readily be used on even moderately curved surfaces.

The present invention has for its object the production of partially cured but still reactive, flexible and deformable resinous films in substantially continuous lengths, which films may be readily and smoothly applied either to flat or to simple curved surfaces and which thereafter are easily cured to form hard, tough, insoluble, heat-resistant, abrasion-resistant, decorative surface coatings. Other objects are the production of resinous surface coatings in substantially continuous lengths and in roll form; the production of resinous surfacings having a hard abrasion-resistant outer surface; the production of resinous films which are highly decorative, either in solid colors or in various designs. Other objects of this invention include the coating of surfaces with hard, tough, resistant and decorative resinous compositions in a single operation and without the necessity of removal of volatile liquid vehicle; the application of relatively thick resinous layers in a single operation; the application of resinous films to curved or irregular surfaces without breaking or wrinkling of the film. A further object of the invention is the production in roll or sheet form of a resinous film, suitable when fully cured for use as a permanent surface coating, which before application to an unfinished surface is essentially permanently flexible, pliable, and in a reactive state. A still further object of the invention is the economical production of multiple layer self-supporting thermosetting resinous films from liquid or plastic resinous compositions and in substantially continuous lengths.

Other objects will become apparent as the description of the invention proceeds.

In a preferred procedure for the production of the novel resinous films of this invention, there is first provided a carrier web or base on which the heat-reactive resinous film is later to be built up. Such a web may, for example, consist of a dense paper web coated with a suitable "strip-coating" of a film-forming composition which results in a flat and smooth surface from which the resinous film may be readily removed by stripping. A heat-reactive resinous composition is applied as a film to the carrier web, by means of coating knife, squeeze rolls, or other well-known means, preferably as a highly viscous but still coatable solution or suspension in a volatile liquid vehicle. The resinous film is then dried and partly cured by exposure to gradually increasing temperature in a suitable oven. The thus formed resin sheet is in direct superficial contact and in intimate clinging engagement with the surface of the carrier web or sheet, but readily strippable therefrom. As a unit the assemblage can then be processed, for example by securing a second resin sheet of somewhat different formula and properties to the exposed surface of the first resin sheet, as described further hereinafter. The two resinous compositions are selected so that they bond together at the center line, so that one composition will provide a hard, resistant outer surface, and so that the other composition will provide additional thickness, a tough supporting underlayer, and in most cases an effective bonding medium for bonding the film to the surface which it is desired to cover. On cooling, the partly cured multiple layer film is found to be tough, pliable, flexible, strong, unified, non-tacky, and capable of being readily stripped in a continuous sheet from the carrier web and wound up on itself in roll form without danger of "blocking" or fracturing. By the term "blocking" is meant the permanent fusion or adherence of one turn of the film to an adjacent turn under the moderate tension developed in the roll during normal winding.

The film thus prepared is now ready for application as a surface covering or for other uses. Depending on its composition and also on the extent to which it has been reacted during manufacture, as well as on the character of the surface to which it is to be applied, the film may be bonded to a surface either by application of heat and pressure, or by means of an intermediate coating of a suitable adhesive cement. Heating in the case of the hot press method, or suitable aging at normal or slightly elevated temperatures in the case of the cement method of application, then converts the thermosetting resinous film to a completely or adequately reacted heat-resistant insoluble form which is ideally suited to its intended use as a protective surface covering.

To quickly illustrate an exemplary embodiment of our resin surfacing film and a method of producing the same, reference is made to the accompanying drawing, in which:

Figure 1 is a schematic elevational view of a preferred form of apparatus for the production of two-layer resinous films hereof in continuous sheet form;

Figure 2 is a cross-sectional view of a carrier web and the two-layer coated resin film, showing the application and removal of the said resin film;

Figure 3 is a cross-sectional view of such a two-layer resin film;

Figure 4 is a cross-sectional view of a three-layer resin film in which the center layer is pigmented; and Figure 5 is a cross-section of a rough wood base object, with scratches in the surface exaggerated for purposes of emphasis, coated with the two-layer resin film of Figure 3.

In Figure 1, the carrier web 11 is unwound from stock roll 12 and carried between mechanically driven guide roll 13 and adjustable coating knife 14, where there is applied from a source of supply not shown, a coating of a plasticized thermosetting resin in a suitable solvent. The coated web then passes to oven 16 where it is supported in vertical loops by mechanically advanced rack sticks 15 and where it gradually passes through the separately heated compartments 17, 18, and 19 of the oven 16. After completing the trip through said oven, the composite web is brought around guide roll 20, thence between mechanically driven guide roll 21 and coating knife 22, where a second coating of a solution of plasticized and/or pigmented thermosetting resin is similarly applied. The coated web is then hung on mechanically advanced rack sticks 23, and passed into oven 24 and through separately heated compartments 25, 26, and 27. From the second oven the coated web passes to unwinding roll 28 where it is cooled, and at this point the two-layer resin film 29, formed by the heating of the resin coatings on the carrier web 11 in the ovens 16 and 24, is stripped from said carrier web 11 and wound into roll form by means of mechanically driven windup drum 30. At the same time, carrier web 11 is pulled from the oven and wound into roll form by mechanically driven windup drum 31.

The carrier web is shown in Figure 2 to consist of a heavy dense flat surfaced paper sheet 32 coated on one surface with a relatively thin film of a resinous stripping coat 33. Resin composition 34, comprising for example an alkyd resin plasticized urea-formaldehyde-butanol resin in a suitable solvent, is applied to the coated paper surface. A second coat of resin composition 35, which may for example comprise an alkyd resin plasticized melamine-formaldehyde-butanol resin (which may be pigmented) in a suitable solvent, is applied over the first coat 34 either before or after the said first layer has been dried and partially heat-cured. The two layers, which at first may be distinct and separate, soon blend at the interface under the action of heat and solvent as indicated at point 36 of the drawing to produce a final dried and partly cured, actually two-layer but effectively unified, thermosetting pliable resinous film 29, which is readily stripped from stripping coat 33 of carrier web 11 without distortion.

Figures 3 and 4, respectively, show in cross-section two-layer and three-layer resinous films according to this invention. Figure 4 includes a central resinous layer 37 which is heavily pigmented so as to produce a lustrous, colored film.

In Figure 5 is shown in cross-section a portion of a wooden object 38, which may be a portion of a wooden desk top, for example, and which has been left in roughened or unfilled condition as indicated by grooves 39 representing pores or scratches in the wood; to this surface is united the two-layer resin film 29 of Figure 3; the application of this film to the wood by means of heat and pressure has, as indicated, caused the resin film to flow into and completely fill the irregularities and depressions in the wood surface, has firmly bonded said film to said surface, and has set or cured the entire film to a permanent, resistant, and smooth surface coating.

In the following specific examples, all parts are given as parts by weight.

EXAMPLE 1

This example illustrates a method of making a self-supporting two-layer thermosetting resin film having particular utility as a self-bonding surface coating for hot-press application to flat or curved wood, metal or other surfaces.

A carrier web is first prepared from a highly calendered hard-surface paper, e.g. a 40 lb. per ream Acme Fourdrinier paper, or a 70 lb. Duracel Fourdrinier paper, by knife-coating one side with a solution of polystyrene in an amount sufficient to provide a dried coating having a weight of about 4 grains per 24 sq. in. The solution of polystyrene is prepared by heating 500 parts of monomeric styrene and 2.5 parts of benzoyl peroxide in 500 parts of xylol to 165–170° F., and adding 1 part of benzoyl peroxide every 3 hours; xylol is added during the heating as required to maintain a workable viscosity; and the process is continued until the viscosity remains constant without further addition of solvent for 1½–2 hours; the resulting polymer is hard and film-forming, and provides a flat, smooth and tenaciously adherent surface coating on the paper when the solvent is removed, as by drying at 120° F. for 15 minutes. This surface coating for the carrier web is chosen with reference to the composition of the resin film so that when the latter is applied in solution form it will have a good wetting action and initial adhesion to the carrier web surface, but will adhere poorly on completion of drying and partial curing so as to permit of stripping from the carrier when subsequently desired.

The carrier web is then coated on the prepared surface, using a suitable knife coater, with a bonding lamina (of my plural lamina resin film) consisting of 30–34 grains per 24 square inches of a resin solution which contains 75% solids, has a viscosity of 19,500 centipoises at 100° F., and is prepared by mixing 85 parts of a urea-formaldehyde-butanol resin solution with 15 parts of a solution of an alkyd resin plasticizer, these solutions being prepared as follows:

*Urea-formaldehyde-butanol resin*

To 1000 parts by weight of 37% formaldehyde solution, add ammonium hydroxide (28% solution) until the pH is between 7 and 8; this requires approximately 20 parts of ammonia by weight. Add 240 parts by weight of urea, and heat the mixture in a suitable kettle at 85° C. for 50–55 minutes or until the urea is all dissolved. Apply a vacuum and drop the temperature to 55–60° C., and then add 592 parts of n-butyl alcohol, 60 parts petroleum xylol ("Velsicol," a high aromatic content petroleum solvent), and 6 parts of orthophosphoric acid (90%) and continue heating under vacuum, removing the water but returning the organic solvent to the still. When no more water comes over, cautiously distill out a portion of the solvent, to produce a highly viscous, clear solution containing 74% by weight of soluble thermosetting urea-aldehyde resin.

The distillation may be stopped at a somewhat lower solids content if desired, with less danger of the resin being carried past the readily soluble stage: the composition of the coating solution is then correspondingly altered to accommodate the change in solids content. However, it is desirable to obtain a high solids content and high viscosity solution, as will be explained later.

Within certain limits, other ratios of urea and formaldehyde may be used, but with the restriction that the formaldehyde must be sufficient to produce a thermosetting resin, and not in such excess that it will volatilize and cause "puffing" or "blistering" of the film.

*Alkyd resin plasticizer*

Heat a mixture of 850 parts sebacic acid, 225 parts diethylene glycol, and 225 parts glycerol at a temperature of 385° F. and with continuous stirring for 2½ hours, then cool to 300–325° F. and hold at that temperature to an acid number of 27, at which point the resin forms a long string when allowed to flow from a stirring paddle. Add ethylene glycol monoethyl ether ("Cellosolve") to form a heavy viscous solution containing 80% by weight of the soluble thermosetting alkyd resin.

In order to dry and partially cure the resinous film, the coated carrier web is then suspended in loops from suitable racks and is heated in an oven, the heat cycle being 30 minutes at 100° F., 30 minutes at 140–145° F., and 20 minutes at 205–210° F.

The viscosity of the resin solution must be low enough so that the solution can be readily coated, which is determined in part by the type of coating equipment available. Thus a heated extrusion type coater would handle a much heavier batch than would a roll coater or even a knife coater. At the same time the viscosity must be as high as possible in order to avoid running of the solution on the carrier web after coating, particularly where the web is suspended in vertical loops from racks as in the present example.

By means of a suitable knife coater there is next applied, over the dried and partially cured bonding coat, a surfacing coat (of my plural lamina resin surfacing film) consisting of 30 grains per 24 square inches of a resin solution which contains 55% solids, has a viscosity of 1425 cps. at 100° F., and is prepared by mixing 85 parts of a melamine-formaldehyde-butanol resin solution with 15 parts of the alkyd resin plasticizer solution as used for the bonding coat. While a melamine resin solution for this composition may be prepared according to the same general procedure as outlined for the urea resin, and preferably with a somewhat increased molar proportion of the amino compound, it has been found equally satisfactory to employ a commercially available solution of a melamine-formaldehyde-butanol resin such as "Melmac 245-8," a 50% solution of a resin having an acid number of 0.4 to 1.0 and in a solvent mixture of equal parts of butanol and xylol.

The coated web is again dried and the resins partially cured by heating on racks in an oven for 30 minutes at 100° F., 30 minutes at 140–145° F., and 70 minutes at 200° F., i.e. to the non-tacky, pliable stage, whereupon, after cooling to room temperature, the two-layer resin film is stripped in continuous lengths from the carrier web and is wound into roll form.

When used as a surface coating, for example on a wood surface such as a plywood panel, the film is placed with the first or bonding layer in contact with the wood surface to be coated, and heat and pressure are applied, for example for 10 minutes at 200 lbs. per square inch and 300° F. in a press having polished steel platens. The bonding layer flows out and completely fills the pores or other irregularities of the wood surface before hardening, and obtains excellent adhesion thereto; while the surface layer is given a highly polished, smooth, hard, glossy surface which is resistant to sunlight, water, solvents, heat and abrasion.

In this example of the manufacture of our plural layer film, the heating cycle is controlled so as to permit evaporation of volatile solvent without bubbling or blistering and without running of the viscous resin in the loops, and also to produce a final film which is non-tacky and non-blocking but also pliable and leathery at room temperatures, while still being capable of further heat-hardening, or firming up, at elevated temperatures and pressures. Thus the initial heating must be at a sufficiently low temperature to prevent too rapid expulsion of solvent and too great a reduction in viscosity; the final curing temperature in making our resin film (before winding the same in rolls) must be high enough to provide an effective cure in a reasonable length of time, but not so high as to jeopardize control of the end-point. This end-point, at which heating is to be terminated, is readily determined by the following test; a small portion of the film is stripped from the carrier web and is pressed together in face-to-back relationship at room temperature and under the maximum possible pressure of thumb and forefinger for several seconds; on release of pressure, the two portions of film must be readily separable without distortion.

The proportions given in this example of 13 parts of alkyd resin (15 parts of solution) to 63 parts of urea resin (85 of solution), and of 13 parts of alkyd resin to 42 parts of melamine resin (85 of solution), produce films which can be readily removed from the carrier web, are flexible and pliable, bond firmly to various surfaces, remain in roll form without becoming brittle for long periods of time, and set up rapidly on application of heat. The proportions may be changed with corresponding changes in properties. For example, in the urea resin formula, reducing the alkyd resin solution to 10% results in a much harder film, but one having less adhesion to wood and other surfaces, and in addition having a tendency toward brittleness. Increasing the alkyd resin solution to 35% results in a soft pliable film which remains in a workable state for prolonged periods of time when stored in roll form, but which sometimes flows unduly under the influence of heat and pressure and which requires additional setting time. However, even this film is firmer in its final cured state than is the ordinary air-dried varnish film, which corresponds in ultimate hardness approximately to that of a formula containing equal parts of alkyd resin and urea resin solutions. Similar variations and results are also possible with the melamine resin. For the type of film described, the alkyd resin solution preferably forms from 15 to 20 percent of each of the two final solutions as coated.

A particular advantage of the method of procedure herein described, of coating on a carrier web, suspending the coated web on racks in an oven, and drying and curing at progressively increasing temperatures and over a relatively protracted period, lies in the fact that by such means it becomes economically possible to cure the resin for desirably long periods while still coating at relatively high speed. Increased rate of cure could of course be obtained by addition of a proper catalyst to the resinous composition; but the partially cured resin film would then continue to set up at an increased rate even at normal temperatures and would not remain flexible and thermosetting in the final roll.

EXAMPLE 2

Where desired, the surface films of this invention may be pigmented or otherwise modified so as to impart a colored or decorative surface to articles to which they may be applied. Thus the surfacing coat of Example 1 may be colored by the addition of 40 parts of titanium dioxide pigment to 100 parts of the resinous composition, suitably by milling the pigment into one-half of the solution on a three-roll paint mill, and subsequently mixing the balance of the solution into the pigmented portion by hand stirring or by any suitable mechanical means. A coating weight of 52 grains per 24 square inches of this pigmented resin solution, which has a solids content of 63% and a viscosity of 8900 cps. when measured at 100° F., is then applied over the bond coat of Example 1, and the composite structure is heated for 30 minutes at room temperature, 30 minutes at 140–145° F., and 20 minutes at 205–210° F. before being stripped from the carrier web and wound up in 50-yard rolls. When applied to a suitable surface by hot pressing, this two-layer film produces a firmly bonded, brilliant lustrous white protective surface coating of excellent durability.

Various other pigments and combinations of pigments or other coloring agents may of course be used with or in place of the titanium dioxide pigment of the above example. For example, 2 parts of phthalocyanine blue pigment may be substituted for the 40 parts of titanium dioxide, with the final heating being increased from 20 to about 30 minutes in order to attain the desired characteristics of non-blocking, etc. as previously described.

EXAMPLE 3

In place of the transparent, translucent or solid color films of the previous examples, films may be produced which carry printed designs in one or more colors. For example, the dried and cured bonding coat of Example 1 may be printed with designs which simulate the grain of natural wood, or various other patterns or designs may be printed thereon. A suitable ink for the purpose may be prepared from the alkyd resin plasticized melamine resin composition used as the surface coat of Example 1; for example, the addition of 2 parts of a brown pigment to 100 parts of the said resinous composition, will produce an ink suitable for the printing of imitation wood grain on the resinous bonding coat. The cohesion between the inextensible carrier web or sheet and the said resinous coat maintains the latter against distortion of area (which might otherwise occur because of its readily extensible nature) during the printing operation. After simple air drying of the printing, a further layer of unpigmented surface coat composition is applied as in Example 1, and drying and heating carried out as therein described.

EXAMPLE 4

The bonding layer may also be pigmented or otherwise modified where this is desirable, as where a clear surface layer having improved depth or glossiness is to be obtained in connection with a colored or printed base. Thus, two parts of a mixture of 10 parts titanium dioxide and 2 parts of red alizarin lake pigment in 40 parts of No. 15 blown castor oil, may be added to 100 parts of the 75% resin solution used in Example 1 as the first or bonding coat, and the composite two-layer film finished as therein indicated.

EXAMPLE 5

Multiple-layer films having three or more continuous layers may be produced for certain purposes. For example, a somewhat soft but highly adherent initial or bonding film, a pigmented center film, and a clear, hard and resistant surface film may be combined. Thus, the previously described compositions may be combined as follows:

Carrier web.—As in Example 1.
Bonding coat.—30 grains of the bonding coat of Example 1.
Center coat.—45 grains of the titanium dioxide pigmented resin composition of Example 2.
Surface coat.—10 grains of the surfacing coat of Example 1.

The coated web is dried and heated after the application of each separate layer, but only to the minimum extent required to eliminate flow in the loops and to make possible the successful application of the next succeeding resin layer, until all three layers are applied; the final cure is carried to the non-tacky, non-blocking stage.

Various other thermosetting resins and thermosetting or even non-thermosetting plasticizers may be used in modifications of the above formulas, although for maximum brilliance, hardness, permanence, and clarity the urea and melamine base resins modified by means of reactive alkyd resins have been found to be most desirable. Certain other resins, and other plasticizers, may however show advantages as regards availability, cost, ease of handling, aging of films in roll form, and other qualities; the invention is therefore not to be limited to any specific examples herein set forth, but covers broadly the novel and original concept of thermosetting resin surface coatings in continuous sheets, as further defined in the appended claims. As additional examples of specific compositions which may be used in the production of these new surface coatings, the following are set forth.

EXAMPLE 6

In place of the alkyd resin plasticizer described in Example 1, various other alkyd resins may be utilized. The percentages of the various resins must then be varied so as to obtain the desired properties of flexibility, heat reactivity, toughness, and the like in the final film.

Thus, 2 parts of the urea-formaldehyde butanol resin solution of Example 1 may be combined with 1 part of "Rezyl 99-5," a non-oxidizing glycol-phthalic anhydride alkyd resin in 60% solution in xylol, having an acid number of 4-8 based on the solids content. The resulting composition has a solids content and viscosity at 100° F. of approximately 69% and 12,000 cps. respectively, and produces a satisfactory first or bonding layer for a multiple-layer film.

"Rezyl 99-5" may also be used with melamine-formaldehyde-butanol resins.

EXAMPLE 7

The first or bonding layer of a multiple-layer film is produced from a solution consisting of 2 parts of the urea-formaldehyde-butanol resin solution of Example 1 and 1 part of No. 15 heavy blown castor oil; the solution thus produced has a solids content of 82.6 percent and a viscosity of 15,000 cps. at 100° F.

The second or surface layer likewise utilizes one part of heavy blown castor oil as plasticizer, in this case with two parts of "Melmac 245-8" resin solution furnishing the thermosetting resin. The castor oil used as plasticizer is not of itself thermosetting, but the film produced with the combination of resin and oil sets up on heating almost as rapidly, and apparently almost if not entirely as completely, as do the films described in the previous examples of this invention.

In order to accomplish more rapid and economical production of the final film, and at the same time to avoid excessively heating and reacting the first layer of resin, the following procedure may sometimes be advantageously employed, particularly where the first applied solution is of considerably higher viscosity than the second or succeeding solutions. Using a knife coater, 35–40 grains per 24 square inches of the high viscosity bonding composition of this example is applied to the carrier web, which is then led directly or with only superficial intermediate drying to a second knife coater where a 30–34 grain coating of the relatively low viscosity surface composition is superimposed. The combination is then dried and cured for 30 minutes at 100° F., 30 minutes at 145–150° F. and 70 minutes at 200–210° F. to the non-tacky, non-blocking but flexible and pliable state, and the film is stripped from the carrier web and wound into rolls.

EXAMPLE 8

Air-drying resins may be used as plasticizers in place of the heat-reactive alkyd resins or the castor oil of the previous examples, in connection with the proper thermosetting resins.

Thus, 2 parts of the urea-formaldehyde-butanol resin of Example 1 is plasticized with one part of "Rezyl 330-5," a 50% solution in xylol of an oxidizing alkyd resin of the fatty acid modified type having an acid number of 6-10, for the first or bonding layer of a two-layer film. The surface layer may consist of one part of "Rezyl 330-5" in two parts of "Melmac 245-8." Metallic driers such as the well-known soluble lead, cobalt and manganese driers may be added to assist in the drying of these films, although driers are not essential for production of useful films.

The films of the previous examples have all been of the thermosetting type, and are most desirably applied by means of heat and pressure. However, they may also be applied by means of various adhesive cements, and particularly so in cases where means for the application of heat and pressure are not readily available. Furthermore, in the case of cement application the films may initially be thermoset to a somewhat harder stage, since adhesion to the underlying surface does not depend upon hot flow of a resinous bonding layer. An essentially completely thermoset resin may indeed be employed as an outer or surface film, by using a sufficiently flexible but sturdy supporting film; and in order to avoid any possibility of ultimate fracture of the outer layer on unwinding of the film from storage rolls, it is here desirable to use a substantially or even completely non-advancing type of material for the inner layer. This is more fully described in the following example.

While the polystyrene-surfaced carrier web of the previous examples may be used, it may be desirable in some cases to use a surface coating of polymerized isobutyl methacrylate resin, applied for example from a 40% solution in xylol, and to the extent of 6–7 grains of the solution per 24 square inches of surfaces.

EXAMPLE 9

A coating of plasticized polyvinyl butyral solution is applied by means of a knife coater to the isobutyl methacrylate polymer surfaced paper carrier web. After drying at 150° F. for one hour, the dried resinous coating weighs 10 grains per 24 square inches. The plasticized polyvinyl butyral solution is made by dissolving 30 parts of polyvinyl butyral "Vinylite VYNC," together with 20 parts of No. 15 heavy blown castor oil in 170 parts of "Cellosolve." For more rapid drying, a more volatile solvent may be used where desired.

A second coating is now applied, which consists of 10 grains (dry weight) of plasticized urea-formaldehyde-butanol thermosetting resin in solution in butanol and xylol, and which is prepared by mixing together 100 parts of "Beetle resin 227–8," a 50% solution of urea-formaldehyde-butanol soluble thermosetting resin in butanol-xylol solvent mixture, with 30 parts of No. 15 blown castor oil and 2.5 parts of an organic phosphate catalyst solution.

The catalyst solution may be prepared by heating three mols of methyl alcohol with one mol of phosphorus pentoxide in the presence of ethyl ether as a heat exchange medium; heating is continued until a clear liquid is obtained, whereupon the required quantity of n-butyl alcohol is added and the ether removed by fractionation to produce a catalyst solution containing 50% volatile solvent.

The combined film is then heated for one hour at 212° F. which removes the solvent and essentially completely cures the second or thermosetting resin layer to the final hard, resistant, and normally somewhat brittle form. However, upon cooling, the composite two-layer film may be readily stripped from the carrier web and wound into storage rolls without cracking or breakage of the outer layer. This is apparently due to the cushioning, toughening and supporting action of the tough but permanently flexible inner layer.

While various cement formulas may be used in applying such a film to various surfaces such as wood, metal, and the like, particularly advantageous results may be obtained by utilizing essentially the same resin solution described for the preparation of the surface layer, and consisting of 100 parts "Beetle 227–8," 30 parts No. 15 blown castor oil, and 2.5 parts acid phosphate catalyst solution, suitably thinned to a brushable viscosity with a solvent such as isopropyl alcohol. This formula has also been used to advantage with films produced as described in various of the preceding examples, particularly when those films were first heated to a more advanced but still flexible state.

The adhesive solution is applied in a thin layer to the surface to be covered, as by brush or spray, and is allowed to air-dry until no longer sticky to the fingers. A convenient test to determine this point is to press the finger-tip firmly against the cement surface for two seconds, then jerk it away; the surface should feel distinctly tacky but there should be no transfer of any portion of the cement to the finger. At this stage, the cement is said to possess the property of "slow grab"; a portion of the resin film may be carefully laid on the cement surface and moved or slid around and into any desired position without sticking, but on allowing the film to remain at rest for a few minutes, or more particularly on pressing the film against the cement as by means of a soft rubber roller, the cement forms a firm adherent and permanent bond to the film. This "slow grab" stage persists, with the particular formula herein described, for from one-half to several hours under ordinary room conditions and with cement films of proper thickness, thus making possible the accurate surfacing of large or complicated objects with the resin films of this invention. Even after a period of several hours and after the "slow grab" property has diasppeared, such a cement coat may be made to form a highly adherent bond to the surfacing film by applying the film under light pressure and moderate temperature, for example at 10–15 lbs. per square inch and 200° F.

An additional advantage accrues from the use of the above described cement with thermosetting films of the urea or melamine resin type. These films may be applied in a completely flexible and even somewhat soft, and therefore easily handled and safely stored, condition. After application by means of the cement, however, and without the influence of added heat, the films rapidly harden to provide a permanent protective finish.

It is believed that this condition is brought about by the migration of a portion of the acid phosphate catalyst from the cement into the resin film, with consequent rapid reaction of the same to the completely cured stage.

EXAMPLE 10

Certain thermosetting phenolic resins may be used as components of these new films. A suitable phenolic resin may be produced by the following procedure:

To a mixture of 1200 parts of phenol and 1296 parts of 37% formaldehyde is added a solution of 12.5 parts of potassium hydroxide in an equal weight of water; the batch is heated in a suitable kettle to 190° F. and held at that temperature until it shows a negative test for the presence of free formaldehyde. The kettle is evacuated to a vacuum of 25 inches of mercury and the batch is then heated at 165–175° F. until it reaches a viscosity of 7000 cps. measured at 175° F. It is then thinned with a 50–50 mixture of water and "Cellosolve" to a solids content of 85% and a corresponding viscosity of approximately 1200 cps. measured at 175° F.

A resinous bonding coat composition may suitably consist of a mixture of 60 parts of the above phenolic resin solution and 40 parts of the sebacic acid-glycol-glycerol alkyd resin solution described under Example 1, which mixture thus has a solids content of approximately 83% and a viscosity of 1200 cps. at 175° F. It may be coated, as by means of squeeze rolls, on a carrier web, and dried and partly cured. A further coating of a similar composition in which the phenolic resin solution is increased to 70 percent may then be applied as the surface coat, followed by drying and further curing, and cooling to room temperature. The film may then be stripped from the carrier web and wound into continuous rolls.

While all of the examples have described the preparation of the resin films with the bonding layer in contact with the carrier web, it is of course obvious, and in fact may in some cases be highly desirable, to apply the so-called surface coat or layer as a first layer and in contact with the carrier web. In such instances a composite results wherein a thin sheet of flexible waterproof readily extensible plastic has a smooth surface in intimate clinging engagement with (yet readily strippable from) the carrier web; and overlying said thin sheet and bonded thereto (sometimes through an intermediate layer, e.g., as in the construction of Example 5) is the bonding layer, which can be a dry-film of activatable non-tacky adhesive. The preparation of the structures herewith with the so-called surface coat in contact with the carrier web is especially desirable where prolonged heating is necessary for the essentially complete hardening of the surface layer, but where such heating might otherwise also harden the bonding layer to a stage beyond that at which it would form an effective bond.

The carrier web on which the resinous films of this invention are formed may consist of a paper base coated with styrene or isobutyl methacrylate polymers as previously described. Other coatings may also be used. Cellulose acetate is one example of a film-forming material which may be used as the surface coating of the carrier web; various varnish coatings may also be used. The particular carrier web to be employed in any specific case depends on the adhesion of the dried film to the treated surface of the web; this adhesion must be sufficiently low so that the film may be easily stripped away. However, it is sometimes possible to add certain stripping agents to the web surface or to the resin itself in order to reduce the adhesion of the film to the web, and thus to permit the use of certain webs or treatments which would otherwise be inoperable.

Where a rough, or feathery, or overlapped edge of resin is produced on the carrier web, difficulty may be encountered in stripping the film from said web. This difficulty may ordinarily be avoided by slitting the film to a narrower width and so as to eliminate the original and more fragile edges. In this process the carrier web may simultaneously be slit and the width thereby reduced. It is, therefore, advantageous to use low-priced materials in the construction of the carrier. However, where the resin film can be controlled by suitable coating means so as to have full and uniform thickness across its entire width, thereby avoiding slitting, it may be desirable to use other and more expensive and permanent types of carrier webs. For example, paper surfaced with metal foil, or smooth-surfaced impregnated cloth, or surface-treated fiber-board may be used. The surface of the carrier web is normally smooth and polished in order to produce a correspondingly smooth and polished resin film surface; but it is also contemplated to provide a rough or patterned surface where a similar surface is desired on the resin film and where the additional effort of removal of film from web will not be sufficient to cause undue tearing or stretching of the film.

The two or more resinous layers in multiple film constructions ordinarily blend together at their mutual surfaces and form essentially a single final film. When the first-applied film is overcured, it may sometimes happen that a second film does not secure perfect anchorage thereto, with the result that the film will delaminate during or after removal from the carrier web. Application of the resins as a solution in an organic solvent will ordinarily avoid this difficulty unless the first film has perhaps been completely reacted to an insoluble stage; but use of water dispersed resins, or extruded soft resin films, both of which are contemplated in this invention, may cause considerable difficulty in this regard unless care is taken to avoid overcure of the previous resin layer.

Hereinabove, with the aid of various illustrative examples, I have described novel methods for preparing surface decorated unitary self-sustaining sheets of flexible, readily extensible resilient plastic. But for the methods herein described, involving the use of a carrier sheet or web to maintain the plastic sheet against distortion of area, said sheet would be distorted (because of its readily extensible resilient nature) during the imprinting of designs (see Example 3 above) or application of other surface decoration.

While my invention has been illustrated in various details, these are not to be taken as limitative. All embodiments within the scope of this application and/or of the appended claims are comprehended.

What I claim is:

1. A composite sheet manipulatable as a unit, said composite comprising the combination of a flexible, relatively stiff, smooth-surfaced, paper supporting sheet, a thin sheet of flexible waterproof readily extensible resilient plastic resin having a smooth surface in intimate clinging engagement with but not adhesively bonded to the smooth surface of said supporting sheet, and a dry film of activatable, substantially non-tacky adhesive bonded to and coextensive with the surface of said thin resin sheet which is not in contact with the supporting sheet, the engagement between said supporting sheet and said thin sheet of resin being strongly resistive to distortional forces exerted on said resin sheet, but said engagement being so weak as to be readily ruptured to permit the supporting sheet to be readily stripped from the resin sheet.

2. A composite sheet material manipulatable as a unit, said composite comprising a combination of a flexible, relatively stiff, smooth-surfaced, paper supporting sheet, a thin sheet of flexible, waterproof readily extensible resilient plastic resin having a smooth surface in intimate clinging engagement with but not adhesively bonded to the smooth surface of said supporting sheet, and a dry film of activatable, substantially non-tacky adhesive bonded to and coextensive with the surface of said resin sheet which is not in contact with the supporting sheet, the engagement between said supporting sheet and said thin sheet of resin being strongly resistive to distortional forces exerted on said resin sheet, but said engagement being so weak as to be readily ruptured to permit the supporting sheet to be readily stripped from the resin sheet.

3. A composite sheet manipulatable as a unit, said composite comprising the combination of a flexible, relatively stiff, smooth-surfaced, paper supporting sheet, a thin sheet of flexible, waterproof readily extensible resilient plastic resin having a smooth surface in the intimate clinging engagement obtained by forming said resin sheet from a fluid mass of resin directly on said supporting sheet, said resin sheet not being adhesively bonded to the smooth surface of said supporting sheet, and a dry film of activatable, substantially non-tacky adhesive bonded to and coextensive with the surface of said resin sheet which is not in contact with the supporting sheet, the engagement between said supporting sheet and said thin sheet of resin being strongly resistive to distortional forces exerted on said resin sheet, but said engagement being so weak as to be readily ruptured to permit the supporting sheet to be readily stripped from the resin sheet.

4. The method of preparing a surface decorated, unitary, self-sustaining sheet of a flexible, readily extensible, resilient plastic which comprises forming from plastic batch material a solidified plastic sheet on an inextensible carrier sheet coextensive with said plastic sheet, said plastic sheet being in direct superficial contact with the surface of the carrier sheet, said surface being smooth and unfavorable to the formation of an interlocking bond with the plastic sheet, to which surface the plastic sheet coheres to provide a fissionable assemblage manipulable as a unit, processing as a unit the two coherent sheets by securing decorative material to the exposed surface of the plastic sheet while maintained against distortion of area by the thereto cohering carrier sheet, and thereafter stripping from the carrier sheet the decorated plastic sheet as a self-sustaining unit.

5. The method of preparing a surface decorated, unitary, self-sustaining sheet of a flexible, readily extensible, resilient plastic which comprises forming from plastic batch material a solidified plastic sheet on an inextensible carrier sheet coextensive with said plastic sheet, said plastic sheet being in direct superficial contact with the surface of the carrier sheet, said surface being smooth and unfavorable to the formation of an interlocking bond with the plastic sheet, to which surface the plastic sheet coheres to provide a fissionable assemblage manipulable as a unit, processing as a unit the two coherent sheets by printing a design on the exposed face of the plastic sheet while the latter is maintained by the thereto cohering carrier sheet and thereafter stripping from the carrier sheet the plastic sheet as a self-sustaining unit.

6. The method of preparing a surface decorated, unitary, self-sustaining sheet of a flexible, readily extensible, resilient plastic which comprises forming from plastic batch material a solidified plastic sheet on an inextensible carrier sheet coextensive with said plastic sheet, said plastic sheet being in direct superficial contact with the surface of the carrier sheet, said surface being smooth and unfavorable to the formation of an interlocking bond with the plastic sheet, to which surface the plastic sheet coheres to provide a fissionable assemblage manipulable as a unit, processing as a unit of two coherent sheets by printing on the exposed face of the plastic sheet a design which includes coordinated portions in multicolor while said plastic sheet is maintained by the thereto cohering carrier sheet and thereafter stripping from the carrier sheet the plastic sheet as a self-sustaining unit.

7. The method of preparing a surface decorated, unitary, self-sustaining sheet of a flexible, readily extensible, resilient plastic which comprises forming from a freely flowing plastic batch material a dry solidified plastic sheet on an inextensible, flexible carrier sheet having free ends, said plastic sheet being in direct superficial contact with the surface of the carrier sheet, said surface being smooth and unfavorable to the formation of an interlocking bond with the plastic sheet, to which surface the plastic sheet coheres to provide a readily manipulable fissionable assemblage, processing the two coherent sheets by passing the same in assembled relation and in flexible condition to and from a decorating zone and while in said zone applying decorative material directly to the exposed surface of the plastic sheet while it is maintained against distortion of area by the thereto cohering carrier sheet, and thereafter stripping from the carrier sheet the decorated plastic sheet as a self-sustaining sheet.

8. The method of preparing a surface decorated, unitary, self-sustaining sheet of a flexible, readily extensible, resilient plastic which comprises forming from a freely flowing plastic batch material a dry solidified plastic sheet on an inextensible, flexible carrier sheet having free ends, said plastic sheet being in direct superficial contact with the surface of the carrier sheet, said surface being smooth and unfavorable to the formation of an interlocking bond with the plastic sheet, to which surface the plastic sheet coheres to provide a readily manipulable fissionable assemblage, processing the two coherent sheets by passing the same in assembled relation and in flexible condition to and from a decorating zone and while in said zone printing a design directly on the exposed face of the plastic sheet while the latter is maintained against distortion by the thereto cohering carrier sheet, and thereafter stripping from the carrier sheet the plastic sheet as a self-sustaining sheet.

9. The method of preparing a surface-decorated, unitary, self-sustaining film of flexible, readily extensible resilient plastic, which comprises forming from a freely flowing batch material comprising a resin, a plasticizer and a diluent, a film-forming layer on a coated surface of a free-ended flexible paper carrier, drying said layer with the aid of heat to drive out said diluent and form a dry film, said surface being smooth and unfavorable to the formation of an interlocking bond with said film, said film cohering with said surface to provide a readily manipulable fissionable assemblage, processing said carrier and said film cohering thereto by passing the same in assembled relation and in flexible condition to and from a printing zone and while in said zone printing a design directly on the exposed face of said film while said film is maintained against distortion of area by the thereto cohering carrier, and thereafter stripping said film from said carrier as a self-sustaining film.

10. In the method of preparing a surface decorated, unitary, self-sustaining sheet of flexible, readily extensible, resilient plastic material, the steps comprising forming from plastic batch material a solidified plastic sheet on an inextensible carrier sheet coextensive with said plastic sheet, said plastic sheet being in direct superficial contact with the surface of the carrier sheet, said surface being smooth and unfavorable to the formation of an interlocking bond with the plastic sheet, to which surface the plastic sheet coheres by a fissionable bond to provide an assemblage manipulable as a unit, processing a unit including the two coherent sheets by securing decorative material to the exposed surface of the readily extensible sheet while maintained against distortion of area by the cohering carrier sheet, and thereafter stripping from the carrier sheet the decorated plastic sheet as a self-sustaining unit.

11. The method of preparing a surface decorated, unitary, self-sustaining sheet of flexible, readily extensible, resilient plastic material which comprises forming from plastic batch material a solidified plastic sheet on an inextensible carrier sheet coextensive with said plastic sheet, said plastic sheet being in direct superficial contact with the surface of the carrier sheet, said surface being smooth and unfavorable to the formation of an interlocking bond with the plastic sheet, to which surface the plastic sheet coheres by a fissionable bond to provide an assemblage manipulable as a unit, processing a unit including the two coherent sheets by securing a second and readily extensible plastic sheet and decorative material to the exposed surface of the first mentioned plastic sheet while maintained against distortion of area by the cohering carrier sheet, and thereafter stripping from the carrier sheet the decorated plastic sheet as a self-sustaining unit.

References Cited in the file of this patent

UNITED STATES PATENTS

| | | |
|---|---|---|
| 942,699 | Baekeland | Dec. 7, 1909 |
| 1,860,000 | Arnam | May 24, 1932 |
| 2,010,857 | Hanson | Aug. 13, 1935 |
| 2,062,088 | Dreyer | Nov. 24, 1936 |
| 2,067,488 | Hough | Jan. 12, 1937 |
| 2,076,456 | Gams et al. | Apr. 6, 1937 |
| 2,218,474 | Moore | Oct. 15, 1940 |
| 2,276,567 | Donaldson | Mar. 17, 1942 |
| 2,280,242 | Kropa et al. | Apr. 21, 1942 |
| 2,304,585 | McMinn | Dec. 8, 1942 |
| 2,311,156 | Casto | Feb. 16, 1943 |

FOREIGN PATENTS

| | | |
|---|---|---|
| 510,942 | Great Britain | Aug. 8, 1939 |

OTHER REFERENCES

Hodgins et al.: "Melamine-Formaldehyde Film-Forming Compositions," Ind. Eng. Chem., vol. 33, No. 6, pp. 769–772 and 778, June 1941.